UNITED STATES PATENT OFFICE.

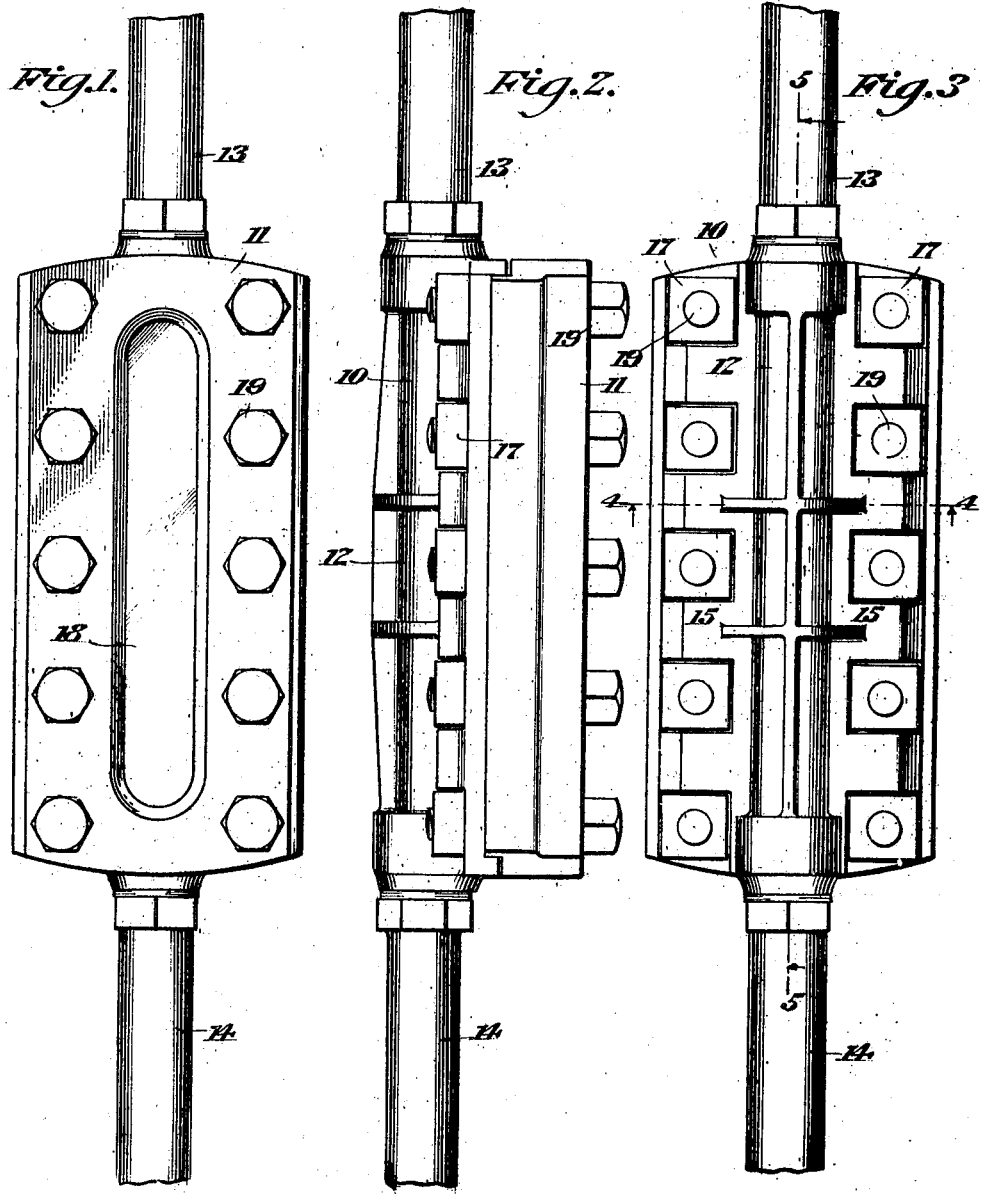

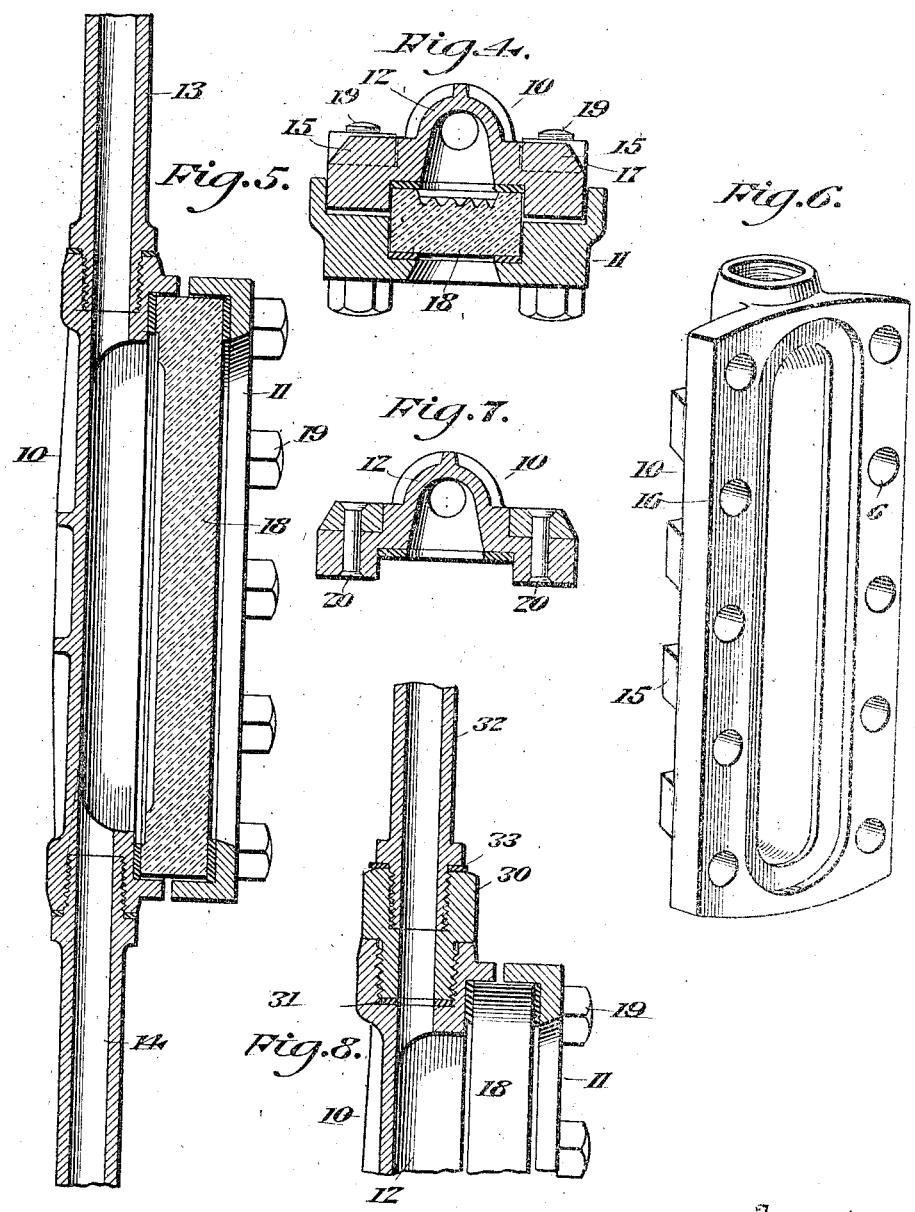

ADOLPH G. BECKMAN, OF BALTIMORE, MARYLAND.

WATER-GAGE.

1,278,831.  Specification of Letters Patent.  Patented Sept. 17, 1918.

Application filed September 21, 1917. Serial No. 192,540.

*To all whom it may concern:*

Be it known that I, ADOLPH G. BECKMAN, a citizen of the United States, residing at Baltimore, State of Maryland, have invented new and useful Improvements in Water-Gages, of which the following is a specification.

In the usual construction of water gages for boilers, the glass is held between two plates, which constitute the body of the gage, the said plates being connected by bolts which enter through openings in one of the plates and have their threads coengaging with threaded openings in the other plate. The water constantly in the gage not infrequently causes the corrosion of the bolts, such disintegration materially weakening the said bolts as well as causing an adhesion between the threads in the bolts and the threads in the depressions or openings engaged by the bolts. The result is, when the glass breaks or when there are other reasons for separating the plates, the bolts do not turn freely in unscrewing and an excessive pressure upon the heads of the bolts twists and breaks the weakened stems thereof. As a consequence, the removal of the plates or sections of the gage is a matter of considerable difficulty, requiring a great amount of time and labor and when the bolts break, as is most frequently the case, it is necessary to drill the same out of the opening which they occupy and to re-tap the plate. Still again, this class of gages requires the employment of bolts of a determined length and wherein the threads thereof must necessarily correspond to the pitch of the threads in the depressions or openings receiving the same.

It may, therefore, be considered the primary object of the present invention to produce a water gage wherein the plates or sections thereof are formed with alining openings, bolts, of any length, being passed through said openings, and nuts, of any desired size or shape engaging with said bolts to hold the sections removably and to permit of the ready separation of the said sections, means being provided upon one of the plates engaging with the said nuts for holding the nuts against turning, so that the bolts may be readily screwed to engage with the nuts or readily unscrewed as desired, but normally held against turning.

It is a still further object of the invention to produce a water gage for boilers in which repairs can be made to the gage without disconnecting the same from the column by the ready removal of the outer plate or face member of the gage.

It is a still further object of the invention to produce a water gage for boilers, comprising two plates or members designed to receive the glass therebetween, both of the members having alining bolt openings, for the reception of the securing bolts, one of the members having its outer face integrally formed with ribs or enlargements surrounding the bolt openings therein and providing pockets for the reception of the nuts which are engaged by the bolts.

Other objects and advantages will appear as the nature of the invention is more fully understood, reference being had to the accompanying drawings, in which, Figure 1 is a face view of a water gage for boilers constructed in accordance with the present invention.

Fig. 2 is a side elevation of the same.

Fig. 3 is a rear elevation of the same.

Fig. 4 is a transverse sectional view approximately on the line 4—4 of Fig. 3.

Fig. 5 is a sectional view approximately on the line 5—5 of Fig. 3.

Fig. 6 is a perspective view of the rear member or plate of the gage, looking toward the rear face thereof.

Fig. 7 is a transverse sectional view through the ribs in the rear plate or body, illustrating the said ribs as separate elements from the body.

Fig. 8 is a section of a slight modification.

Like characters throughout the several views designate like parts.

The gage comprises a rear plate or section 10 and a front plate or section 11. The rear plate 10, in reality, comprises the body of the gage, the same being centrally formed, upon its rear face, with an enlargement 12 which is semi-cylindrical in cross section and which has its top and bottom closed, except for the connection therewith of the boiler pipes 13 and 14 the same being provided with the usual valves, (not shown). The tubular enlargement 12 is preferably reinforced by both longitudinal and transverse ribs, and the plate 10, to the opposite sides of the said tubular member 12 is integrally formed with spaced ribs 15—15, and between each pair of the central ribs, and outward of the end ribs, the plate 10 is provided with bolt openings 16. The spaces between the ribs 15 providing pockets for nuts 17.

The outer plate or front member 11 is provided upon its inner face with a longitudinal depression corresponding with a similar depression in the outer face of the rear plate or body 10, the last referred to depression communicating with the tubular member 12 of the said member 10, while the depression in the outer plate 11 is centrally formed with an elongated opening. Within each of these depressions are arranged the usual compressible gaskets, and also within these depressions and contacting with the said gasket is the sight glass 18. The front plate 11 has its sides flanged and the said flanges lap the sides of the rear plate 10, and the said front plate 11 is provided with a plurality of openings alining with the bolt openings 16 in the rear member. The numerals 19 designate the bolts, the same being of any desired size and having heads of any desired shape, the shanks of the said bolts being, however, of a size to be freely passed through the alining openings in the plates comprising the body of the gage and being also of a size to engage with the threads in the bores of the nuts 17. The nuts are effectively housed between the ribs 15 in the pockets provided therefor, so that accidental turning of the said nuts will be prevented. The bolts being freely passed through the openings in the members comprising the gage and not being threaded in either of the plates insures the ready removal of the nuts from the bolts and consequent ready separation of the front plate from the rear or body of the gage.

The ribs 15, while preferably integrally formed with the rear plate 10 may, and as illustrated in Fig. 7 of the drawings, be secured to the said plate by rivets or screws 20. In this instance, a back plate of an ordinary construction of gage may be employed, but also in this instance, the bolt openings in the said back plate or body to the opposite sides of the boiler, rivets are bored entirely through the body and are not provided with threads.

Should the water glass be constructed of cast iron, as illustrated in Fig. 8 of the drawings, the threaded openings at the opposite ends thereof may receive the threaded end of a brass bushing 30, the bushing compressing a washer 31 against the shoulder provided at the threaded entrance to the device and the said bushing is designed to remain a permanent fixture with the water glass. Removably connected with the interior threads of the bushing is the brass water pipe 32, the same being provided with the usual shoulder and compressing a gasket 33 between the outer end of the bushing 30 and the said shoulder of the pipe 32.

Having thus described my invention, what I claim is:

1. A water gage for boilers including a front member and a rear member, each of said members having alined openings, bolts passing through the openings, spaced enlargements providing ribs disposed around the bolt openings of one of the plates and providing pockets, and nuts in said pockets engaged by the bolts.

2. A water gage for boilers comprising a front member and a back member, said back member having its rear face provided with a semi-cylindrical enlargement, longitudinal and transverse reinforcing ribs on said enlargement, laterally extending ribs upon the back member on the opposite sides of the cylindrical enlargement, each of said members having alined bolt openings, the bolt openings of one of the members being arranged centrally of the transverse ribs, the spaces between the ribs providing pockets, nuts in said pockets, and bolts passing through the alined openings in the plates and engaging with said nuts.

In testimony whereof I affix my signature.

ADOLPH G. BECKMAN.